(12) United States Patent
Bodin et al.

(10) Patent No.: US 7,103,670 B2
(45) Date of Patent: Sep. 5, 2006

(54) STREAMING DIGITAL CONTENT UNDER REMOTE DIRECTION

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 09/881,915

(22) Filed: Jun. 14, 2001

(65) Prior Publication Data
US 2003/0009574 A1    Jan. 9, 2003

(51) Int. Cl.
*G06F 15/16*    (2006.01)
*G06F 15/167*   (2006.01)

(52) U.S. Cl. .................. 709/231; 709/203; 709/217

(58) Field of Classification Search ........ 709/201–205, 709/217–235, 200; 719/310, 311–318; 717/100, 717/101–104, 114; 725/112; 715/513; 714/755, 714/759
See application file for complete search history.

(56) References Cited

OTHER PUBLICATIONS

Application Server Solution Guide, Enterprise Edition: Getting Started, Nusbaum, May 2000, Nusbaum et. al., pp. 1-45, 416 434.*
Java Media Framework API Guide, JMP 2.0 FCS, Nov. 19, 1999, Sun Microsystems, pp. 1-66, 109-135, 173-178.*

* cited by examiner

*Primary Examiner*—John Follansbee
*Assistant Examiner*—Haresh Patel
(74) *Attorney, Agent, or Firm*—John Biggers; Mark S. Walker; Biggers & Ohanian, LLP (57) ABSTRACT

Methods, systems, and products for remote direction of streaming digital content from a multiplicity of sources of digital information to a multiplicity of client devices, including receiving digital content from the sources, receiving from a remote director and storing in computer memory remote director instructions, transcoding the digital content from sources into digital content having streaming format, including in an output stream, in dependence upon the remote director's instructions, digital content having streaming format, and communicating to client devices the output stream.

33 Claims, 5 Drawing Sheets

214 CLIENT DEVICES
- 232 DeviceType
- 256 ScreenSize
- 258 FrameRate
- 260 AudioAvailable

FIG. 2b

218 TIER ATTRIBUTES
- 232 TierID
- 228 DeviceType
- 242 Demographics
- 244 Preferences
- 246 CommSchedID
- 234 ServiceID
- 236 SvcSubscrLev
- 238 EventID
- 240 EvSubscrLev
- 241 NetworkAddress

FIG. 2a

248 EVENT
- 238 EventID
- 262 Description
- 264 StartDate
- 266 StartTime

FIG. 2e

216 COMMERCIAL SCHEDULE
- 246 CommSchedID
- 250 Date
- 252 Time
- 254 SourceID

FIG. 2c

212 USER ATTRIBUTES
- 226 UserID
- 268 Password
- 242 Demographics
- 244 Preferences

STREAMING DIGITAL CONTENT UNDER REMOTE DIRECTION

BACKGROUND OF THE INVENTION

1. Field of the Invention

The field of the invention is data processing, or, more specifically, methods, systems, and products for streaming digital content remotely directed.

2. Description of the Related Art

Streaming digital content delivered to users via networks is a powerful way of delivering substantive content of entertainment, education, and business communications to users. In the current state of the art, however, the users themselves are required to control presentations of streaming digital content. Many prior art implementations of streaming video and audio, including for example, RealPlayer™ from RealNetworks, Inc., of Seattle, Wash., Apple's QuickTime™, and Microsoft's Windows Media Player, actually require user to have some kind of video viewer application open in order to control video streaming. User controls are simple, including the analogues for the controls found on VHS videotape recorders, Play, Pause, Stop, and the like. During playback of a clip in such prior art devices, no director control is provided on the server side of the stream of digital content. Most prior art systems for formulating presentation of streaming digital content are oriented to formulating playback of clips recorded prior to their presentation over a network. To the extent that control systems exist for formulation and control of digitized output streams of live video and audio, such controls are expensive and specialized, typically requiring direct connection to particular servers, workstations, or other computers. There remains in the art therefore, a need for convenient, powerful, flexible, means of formulating and controlling streaming digital content.

SUMMARY

In summary, embodiments are disclosed of methods of remote direction of streaming digital content from a multiplicity of sources of digital information to a multiplicity of client devices the method implemented upon a network of digital computers, at least one of the digital computers comprising a content server upon which the steps of the method are implemented in computer memory and at least one computer processor. Embodiments of methods typically include receiving digital content from the sources, the digital content having a multiplicity of digital formats; receiving, from a remote director, and storing in computer memory, remote director instructions, the remote director instructions including instructions for selections of digital content for inclusion in an output stream; transcoding the digital content from sources into digital content having streaming format; including in an output stream, in dependence upon the remote director's instructions, digital content having streaming format; and communicating to at least one of the client devices the output stream. In typical embodiments, the client devices comprise client device attributes, said transcoding further comprising transcoding in dependence upon the client device attributes.

In typical embodiments, client device attributes include device type, screen size, frame rate, and audio status.

In typical embodiments, a remote director comprises a personal computer coupled through a network to a content server, and embodiments of inventive methods typically include sending from the remote director to the content server remote director instructions. In typical embodiments, a hyperlinked URL invoked through a hot spot on a video screen of a remote director in turn invokes on a content server a servlet. A servlet in typical embodiments is an object, an aggregate of data elements and member methods, containing member methods for administration of digital content from sources, transcoding, selecting, and communicating the selected, transcoded digital content to client devices.

In typical embodiments, member methods in a servlet function to receive hyperlinks to remote director instructions in the form of URLs wherein the URLs identify specific member methods, either in the servlet or in other related class objects. The remote director instructions in such embodiments include both a URL and a member method or computer program name. The specific member methods so identified comprise computer programs each of which is fashioned to carry out a particular task involved in transcoding, selecting, and communicating to client devices digital content from sources. Carrying out a remote director instruction includes executing the computer program or member method identified by the URL of the remote director instruction.

In some embodiments, the member methods identified by URLs of remote director instructions are executed as separate computational processes, so-called heavyweight processes each execution of which involve a full context switch at the operating system level. In many embodiments of the present invention, however, the member methods identified by URLs of remote director instructions are executed as lightweight threads of execution, sharing memory segments with other threads and not requiring full context switches for execution. Many embodiments implement servlets in Java at least partly because Java as a computer language has particular support for threaded program execution in the form of Java's thread-level URL dispatch routines. In typical embodiments of the present invention, the member methods identified by URLs of remote director instructions are implemented as Java thread-level URL dispatch routines. In typical embodiments, a remote director instruction comprises an instruction to select for transcoding and streaming digital content from a specific source.

Embodiments of inventive methods typically include also registering a user for a service, the service identified by a service identification code, the service comprising at least one digital content stream; logging in the user for the service, logging in the user further comprising assigning values to user login attributes, the user login attributes comprising user identification, device type, network address, and a tier; and assigning a tier value in dependence upon the device type and the service identification code; wherein the selections are dependent upon the tier; wherein transcoding further comprises transcoding in dependence upon the tier; and wherein communicating to at least one of the client devices the output stream further comprises communicating the output stream to the network address. In typical embodiments, registering a user includes creating a service registration record comprising service registration attributes comprising user id, service id and service subscription level and assigning a tier value further comprises assigning a tier value in dependence upon the service subscription level.

Typical embodiments include registering a user for an event, the event in typical embodiments identified by an event identification code, the event comprising at least one digital content stream, at least one source, a start date and a start time; logging in the user for the event, logging in the user further comprising assigning values to user login attributes, the user login attributes comprising user identification, device type, network address, and a tier; and assigning a tier value in dependence upon the device type and the event identification code; wherein the selections are dependent upon the tier; wherein transcoding further comprises transcoding in dependence upon the tier; and wherein communicating to at least one of the client devices the output stream further comprises communicating the output stream to the network address. In typical embodiments, registering a user includes creating an event registration record comprising event registration attributes comprising user id, event id, event subscription level, start date, and start time and assigning a tier value further comprises assigning a tier value in dependence upon the event subscription level.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION OF EXEMPLARY EMBODIMENTS

Introduction

The present invention is described primarily in terms of methods for remote directions of networked streaming digital content presentations. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"API" refers to an application program interface. APIs are standard sets of routines, protocols, and tools for building software applications.

The terms "client," "client device," and "device" are used as synonyms in this specification, referring to any device capable of accessing a server through a network. Examples of client devices are personal computers, special purpose devices that are internet-enabled, internet-capable personal data organizers, and others that will occur to those of skill in the art. Various embodiments of client devices are capable of wired and/or wireless network access. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more content servers is well within the scope of the present invention.

The term "servlets" refers to software modules that extend request/response-oriented servers, such as Java-enabled web servers. For example, a servlet might be responsible for taking data in an HTML order-entry form and applying the business logic used to update a company's order database. Servlets are to servers what applets are to browsers. Unlike applets, however, servlets have no graphical user interface. Servlets can be embedded in many different servers because typical servlet APIs assume nothing about a server's environment or protocol. As a practical matter, servlets are most widely used within HTTP servers, and many web servers support Java servlet technology.

"CGI" refers to the standard Common Gateway Interface for implementation of server scripts. Servlets are an effective replacement for CGI scripts. Servlets provide a way to generate dynamic documents that is both easier to write and faster to run. Servlets also address the problem of doing server-side progrramming with platform-specific APIs: they are developed with a Java Servlet API, a standard Java extension. In this fashion, in typical embodiments of the present invention, servlets are used to handle HTTP requests issued through browsers from client devices.

In conjunction with multithreading technology, which is strongly supported in Java for example, servlets are very supportive of collaboration among people. A single servlet can handle multiple requests concurrently, and can synchronize requests. Servlets can forward requests to other servers and servlets, so that servlets can be used to balance load among several servers that mirror the same content, and to partition a single logical service over several servers, according to task type or organizational boundaries.

"URL" means Universal Resource Locator, the standard method of associating world wide web data locations with network addresses for data communications. Many embodiments of the invention function by associating URLs with Java member methods in servlets on content servers, the member methods being called, run, invoked, or activated by invocation of associated URLs. In fact, some standard forms of URL are capable of directly identifying servlets, member methods within servlets, and providing data parameters for use in calls to member methods in servlets. Such URLs are typically invoked through areas of display screens in client devices, the display screen areas being activated for receipt of mouse clicks, gestures, shortcuts, keystrokes on keyboards, or other physical indications of URL selection or invocation.

Servlet URLs can be used in HTML tags, where, for example, would otherwise be found URLs for CGI scripts or URLs identifying file locations on web sites. Servlet URLs are used, for example, as destinations of HTML anchors, as actions in HTML forms, and as locations to be used when HTML META tags direct that HTML pages be refreshed.

"World Wide Web," or more simply "the web," refers to the well-known system of internet protocol ("IP") servers that support specially formatted documents, documents formatted in a language called HTML for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

HTML supports hyperlinking URLs connecting to other documents as well as graphics, audio, and video. Hyperlinks support changing documents by invoking URLs through "hot spots." In this specification, the term "hot spot" is used to refer to any area of a display, the area being associated with a particular URL, which area is sensitive to physical indications of invocation, including for example, mouse clicks on radio buttons and shortcut graffiti gestures on scratch pads of personal data organizers such as Palm Pilots™.

DETAILED DESCRIPTION

This specification discloses example embodiments of methods, systems, and products for controlling and delivering digital content to a number of clients. In typical embodiments, the clients need not control separate digital content feeds but rather will get a consistent feed based on the preemption and routing of the digital feeds from a content server. In typical embodiments, a director controls the content server, and most embodiments support as a director any device that can attain network access. More specifically, there is in typical embodiments no requirement that the director be a terminal directly coupled to the content server.

Typical embodiments of the inventive methods and systems provide means for distributing any form of digital content from any digital media to any number of web clients while maintaining a control mechanism by a remote director. This control mechanism or director further supports changing digital content sources and streams, and changing attributes such as frame rates, so as to provide seamless presentations to any number of clients. Typical embodiments of the director mechanism allow for a hands-off approach in terms of the client devices. Users in typical embodiments are not required to operate any controls on client devices but rather can simply view the contents of the streaming presentation.

Figure 1:
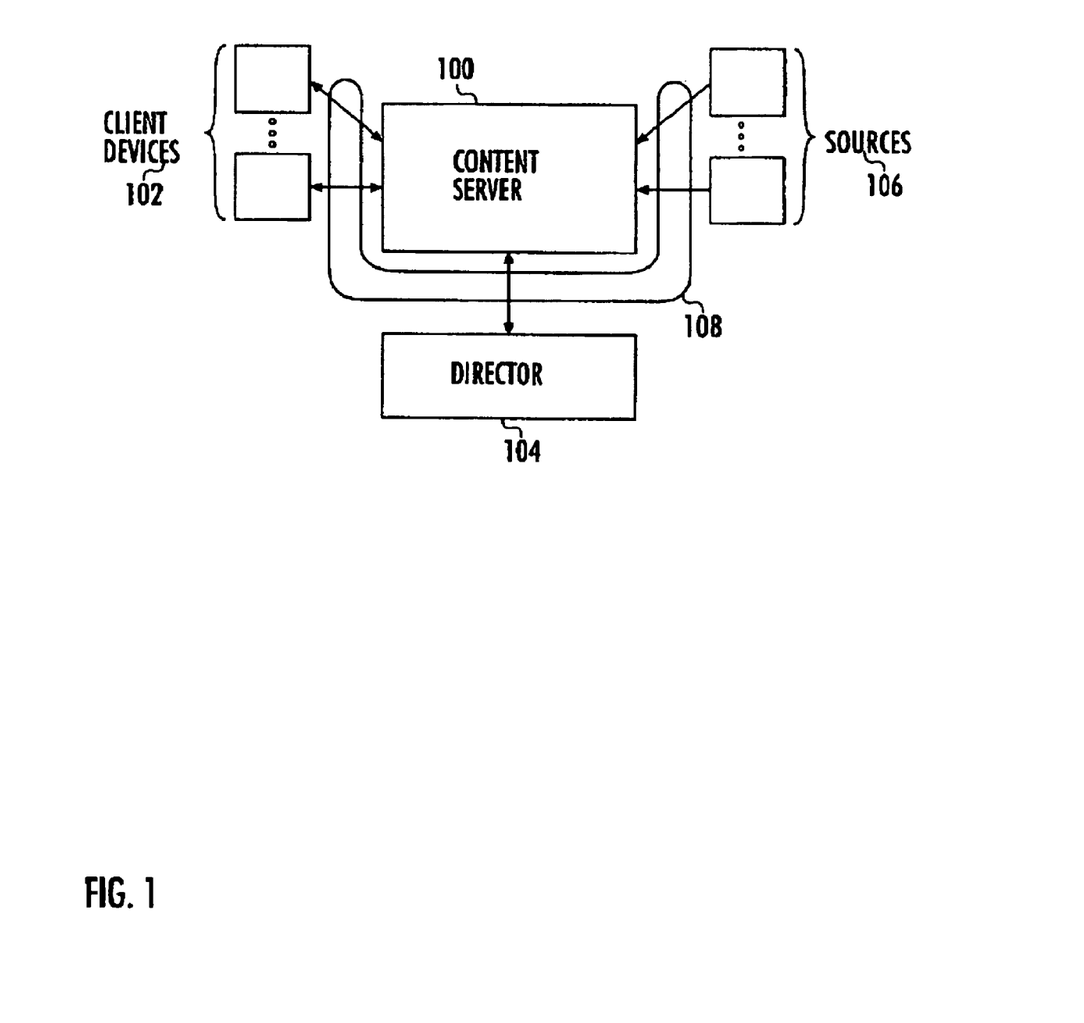
FIG. 1 is an overall block view of an embodiment of a system for remote direction of streaming digital content.

Referring to FIG. 1, an aspect of the invention is seen as a system for remote direction of streaming digital content from a multiplicity of sources (106) of digital information to a multiplicity of client devices (102) implemented upon a network (108) of digital computers, at least one of the digital computers comprising a content server (100) upon which system is implemented in computer memory and at least one computer processor.

Figure 2:
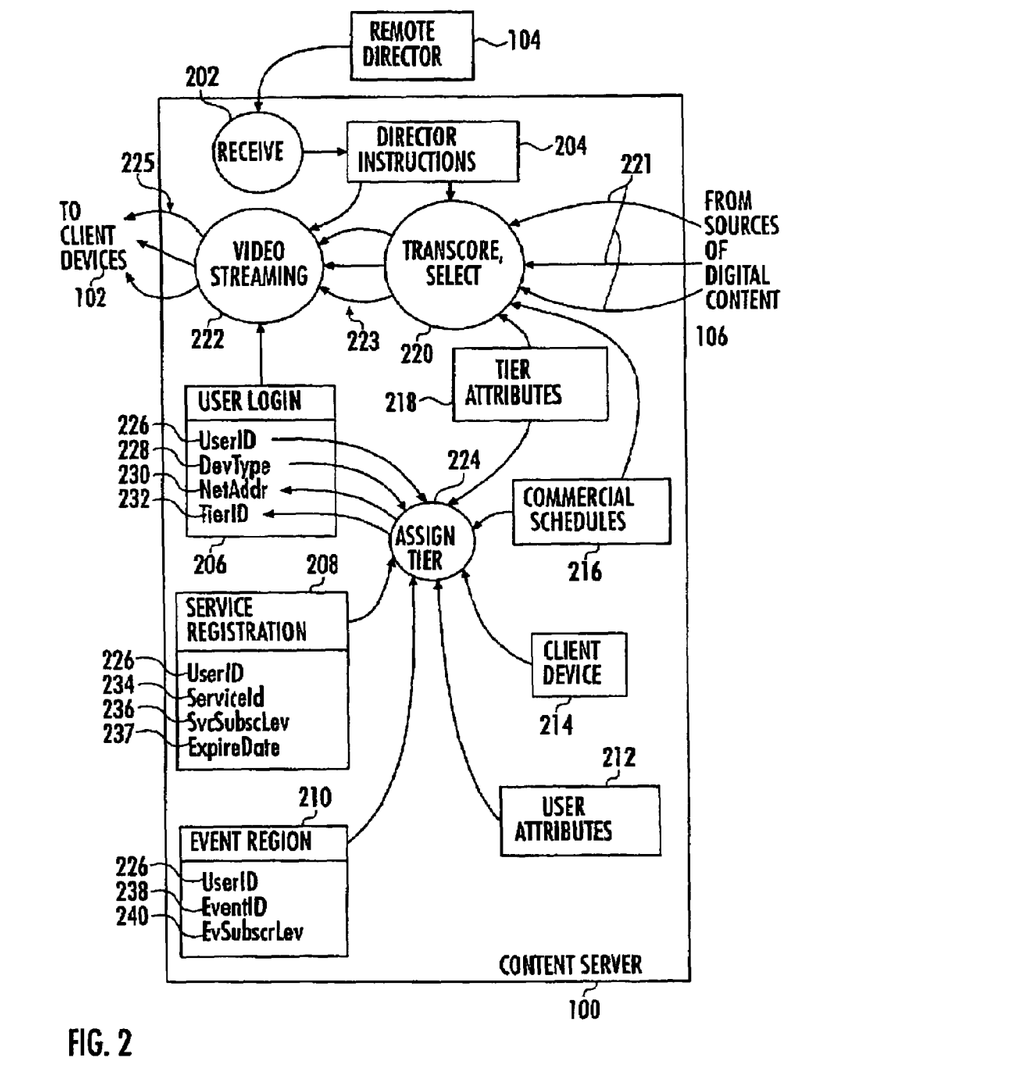
FIG. 2 is a process flow diagram illustrating several example embodiments of methods of remote direction of streaming digital content.

A more detailed example embodiment is shown in FIG. 2 as including a method of remote direction of streaming digital content. The example of FIG. 2 includes also receiving (221) digital content from sources (106), the digital content having many different digital formats. Examples of digital formats useful with various embodiments of the invention include JPEG, MP3, MPEG, GIF, HTML, text, XML, and the like. Other digital formats for digital content will occur to those of skill in the art, all of which formats are useful with embodiments of the present invention.

A further embodiment shown in FIG. 2 includes receiving (202), from a remote director (104), and storing in computer memory, remote director instructions (204), the remote director instructions including instructions for selections of digital content for inclusion in an output stream. The illustrated embodiment further includes transcoding (220) the digital content from sources into digital content having streaming format (223).

The illustrated embodiment also includes in at least one output stream (225), in dependence upon the remote director's instructions, digital content having streaming format. The illustrated embodiment, as do typical embodiments, includes communicating through a data communications network to at least one client device (102) the output stream (225).

In typical embodiments, client devices comprise client device attributes, and transcoding includes transcoding in dependence upon the client device attributes. More specifically, for example, transcoding includes in typical embodiments transforming digital data content to conform to a device's screen size, color requirements, or audio availability. Client device attributes typically include, for example, device type, screen size, frame rate, and audio availability.

In typical embodiments, transcoding includes transforming JPEG images into streaming format. In many embodiments, transcoding includes transforming a digitized digital content feed from a video camera into streaming format. In many embodiments, transcoding includes transforming a digitized video feed from a video camera into streaming format for a particular screen size or a particular frame rate. Transcodings including other data transformations as will occur to those of skill in the art. Any transformation of digital content is well within the scope of the present invention.

In many embodiments, the remote director (104) comprises a personal computer coupled through a network to the content server (100), and the method in many embodiments includes sending from the remote director to the content server remote director instructions (204). In many embodiments, sending director instructions includes invoking through URLs displayed on a terminal of the remote director member methods of servlets installed on the content server, each URL invoking a single servlet member method, each servlet programmed to administer threads of execution to carry out remote director instructions. In many embodiments servlets comprise member methods in Java objects, and invoking a servlet, or invoking a servlet member method, means to call a public member method in a Java object. In many embodiments, the member methods are implemented as Java thread-level URL dispatch routines. Remote director instructions typically comprise at least one instruction to select for transcoding and streaming digital content from a specific source.

More specifically, for example, servlet URLs are typically implemented in the following form:
browser url="http://myIP:8080/servlet/myservlet?parm1=parameter1
browser url="http://myIP/myservlet?parm1=1&parm2=2

The following is a typical example of an embodiment of servlet structure represented in pseudocode:

```
import javax.servlet.*;
import javax.servlet.http.*;
public class myservlet extends HttpServlet
{
    public void init(ServletConfig conf) throws ServletException
    {
        super.init(conf);
        ...
    }
    public void service(HttpServletRequest req,
    HttpServletResponse res) throws
            IOException { }
    public void destroy( ) { }
}
```

The following is a typical example of a computer program, in this particular example, a Java member method implemented as a Java thread-level URL dispatch routine and depicted in the following pseudocode:

```
        public void service(HttpServletRequest req,
        HttpServletResponse res) throws
                IOException
        {
            request = req.getParameter("request");
            if(request.equalsIgnoreCase("view"))
                getView( );
            if(request.equalsIgnoreCase("reset"))
                reset( );
        }
```

Figure 4A:
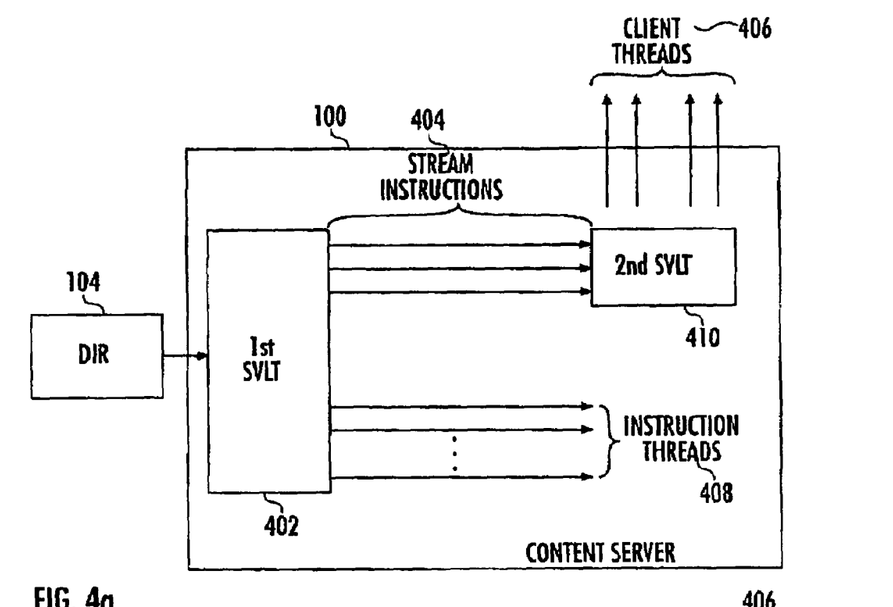
Figure 4B:
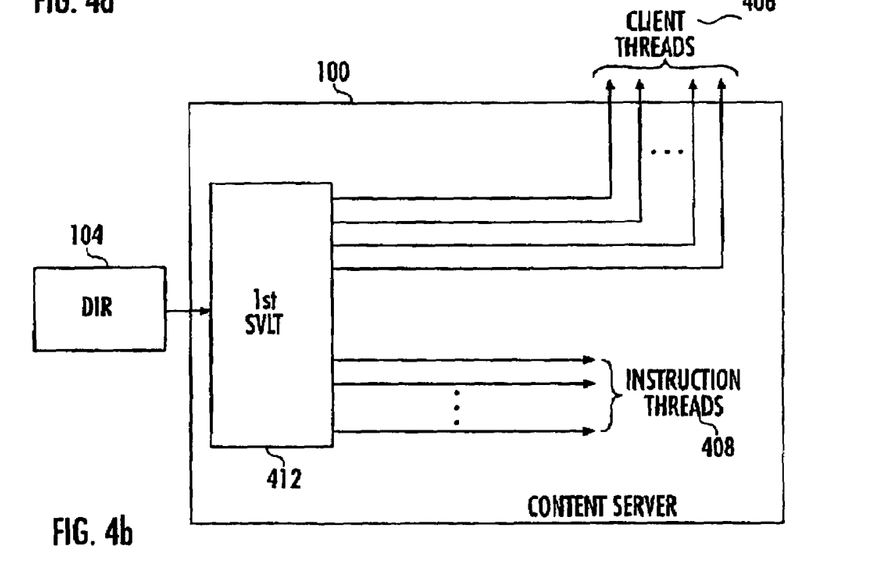

FIGS. 4a and 4b illustrated embodiments of alternative servlet architectures. The example embodiment shown in FIG. 4a includes a director (104) coupled for data communications to a first servlet wherein the first servlet administers threads of execution for remote director instructions (408). The example architecture of FIG. 4a includes also a second servlet (410), the second servlet being configured to administer threads of execution which themselves carry out data communications with individual client devices. In typical embodiments, each thread of execution for a client device (406) is assigned to a particular client device located on a network by an internet protocol address known to the thread. In the example architecture of FIG. 4a, the first servlet is coupled to the second servlet for communication of data and for communication of instructions by calls to member methods within the second servlet. In the example architecture of FIG. 4a, the coupling between the two servlets is accomplished through threads of execution administered by the first servlet. In embodiments of this kind it is typical that each thread would be assigned responsibility for carrying out one remote director instruction regarding control of the streams of digital content communicated to client devices by use of the client communications threads of the second servlet. Further alternative embodiments of inter-servlet communications and control will occur to those of skill in the art, all such embodiments being well within the scope of the present invention.

FIG. 4b illustrates an alternative example embodiment of servlet architecture useful with the present invention. In the example embodiment of FIG. 4b, both the threads for client communications (406) and the threads for execution of remote director instructions (408) are implemented through a single servlet (412). Alternative example architectures include implementation of an additional servlet administering threads of execution for data conversion and transcoding, or an additional servlet administering threads of execution for selecting particular sources of digital content for particular output streams. Further alternative embodiments of servlet architecture will occur to those of skill in the art, all such embodiments being well within the scope of the present invention.

It is useful to note that in typical embodiments, there is no required physical difference between the director and the client devices. Both are often personal computers coupled for data communications through a network to a content server. What distinguishes the director in typical embodiments is that the director in logging on to the server is accorded access through URLs to member methods to which access is restricted to users having director privileges. In many embodiments, only one director is allowed access at any particular time, to reduce the risk of conflicting director instructions, although there is no particular exclusion within the invention itself of allowing more than one director coupled to a content server.

Many embodiments of the present invention include registering a user for a service, the service being identified by a service identification code. FIG. 2 at reference 208 shows an example embodiment of a data structure representing a user's registration for a service, including a user identification code (226), a service identification code (234), and a service subscriber level (236). The service subscriber level is included in the illustration because many embodiments associate fee structures and levels of service with service subscription levels. Services typically comprise aggregations of digital content streamed through one or more websites to users through client devices over an extended period of time. Indeed, in typical embodiments, the services themselves are not time-limited, although the user's service registrations often are (237). User's service registrations are often time-limited because fee structures impose time limits on the service registrations as such, although such time limits to not affect the services themselves.

Typical embodiments include logging in a user for the access to a service. Logging in a user typically includes assigning values to user login attributes (206), including for example, user identification (226), device type (228), network address (230), and a tier (232). The user identification typically is determined through a login prompt. The device type in typical embodiments is derived from a browser header at logon. The network address in many embodiments is an internet protocol address, in many embodiments used to comprise a socket.

Figure 2A:
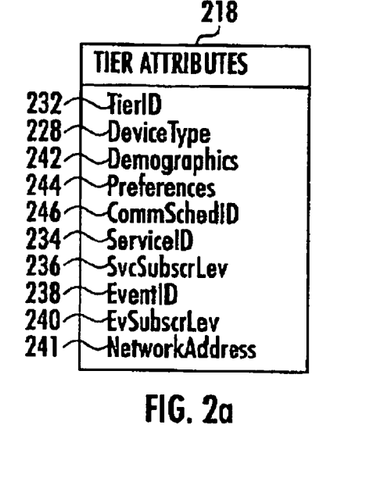
FIG. 2a is a data structure diagram of exemplary embodiments of attributes of tiers.
Figure 2B:
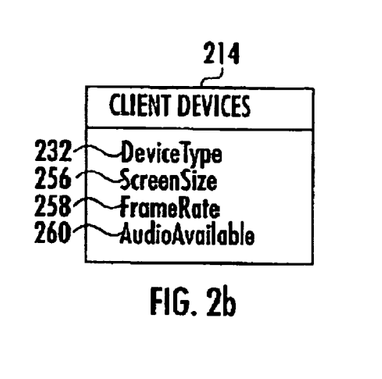
FIG. 2b is a data structure diagram of exemplary embodiments of attributes of client devices.
Figure 2C:
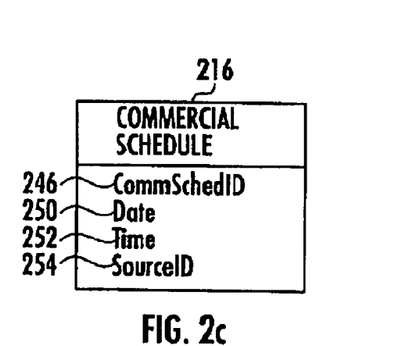
FIG. 2c is a data structure diagram of exemplary embodiments of attributes of commercial schedules.
Figure 2D:
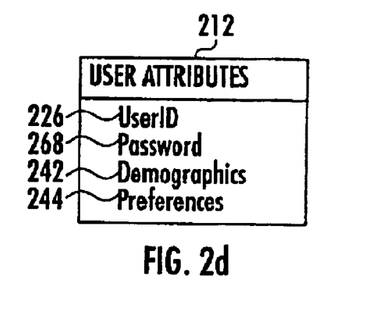
FIG. 2d is a data structure diagram of exemplary embodiments of attributes of users.

The tier is an identifier for a group of client devices identified according to grouping factors such as, for example, device type, subscription level, user demographics or user preferences. Tiers in typical embodiments are identified in tier attribute data structures such as the one illustrated for example at reference 218 in FIG. 2. A more detailed example embodiment of a data structure representing a tier is illustrated at FIG. 2a, where an example tier is shown as including a tier identification code (232), a device type (228), a data element for user demographics (242), a data indication of user preferences (244), a commercial schedule identification code (246), a service identification code (234), a service subscriber level (236), an event identification code (238), and an event subscription level (240).

Demographics include such user attributes as age, residence location, income level, occupation, and other demographics as may occur to those of skill in the art. Embodiments using any demographic are well within the scope of the present invention. User preferences include attribute indicators of special needs in support of disabilities, content limitations such as exclusions of adult material, profane language, or depictions of violence, preferences regarding subjects of commercial messages, and other user preferences as occur to those of skill in the art. Embodiments using any attribute indicators of any user preference regarding digital content are well within the scope of the present invention.

Typical embodiments also include assigning a tier value in dependence upon the device type and the service identification code. In typical embodiments, director selection of digital content and transcoding are also dependent upon tiers. In typical embodiments, registering a user includes creating a service registration record (208) comprising service registration attributes comprising user identification (226), service identification (234), service subscription level (236), and service expiration date (237), and in such embodiments, assigning a tier value typically include assigning a tier value in dependence upon the service subscription level.

The director in such embodiments has the capability of formulating output streams according to tier. Thus an embodiment utilizing the example structure shown in FIG. 2a, has the capability of presenting digital content in one or more output streams comprising a particular tier, for example, for a hand-held, network-capable, personal data organizer having a screen size of 800×600 pixels (according to device type 228), with content filtered to exclude graphic violence (according to user preference 244), with commercial content filtered to include automobile advertisements (user preference), with commercial content further filtered to exclude automobile advertisements for automobiles costing less than $30,000 (demographics 242), with commercials scheduled so as to occur no more than once per half-hour (in dependence upon service subscription level 236). Typical director access to servlets on the content server means that director instructions issued at any time by invoking URLs with as little as a single mouse click, one digitizing pad gesture, or a single keystroke, seamlessly and immediately alter tier structure and therefore the presentation of digital content to users of client devices in a tier.

Typical embodiments also include communicating to at least one of the client devices an output stream (225). In such embodiments, communicating the output stream or streams further comprises communicating the output stream to the network address (230) associated with a user's login (206 on FIG. 2). It is useful to note that in many embodiments, the network address associated with a user's login is a network address, typically associated with a URL, through which digital content is provided for a tier, as at the example at reference (241) in FIG. 2a. That is, in such embodiments, as shown in FIG. 2, the tier assignment function (224) assigns to the user login (206) a tier (232) according to client device type (214), user attributes (212), commercial schedules (216), and service registrations (208) or event registrations (210).

Many embodiments that assign network addresses to tiers, as shown for example at reference 241 in FIG. 2a, do not use network addresses in user logins, because in such embodiments, the stream output to the user and the user's client device will be directed through the network address identified with the tier. Some embodiments do not use tiers; such embodiments typically therefore assign a network address to individual user logins. In many embodiments, the assigned network address, whether it is assigned directly through a user login or indirectly through a tier structure, identifies a URL, to which the client device browser is directed at login, the URL identifying a website location through which an output stream for the tier is delivered to client devices associated with user logins having the same assigned tier.

Figure 2E:
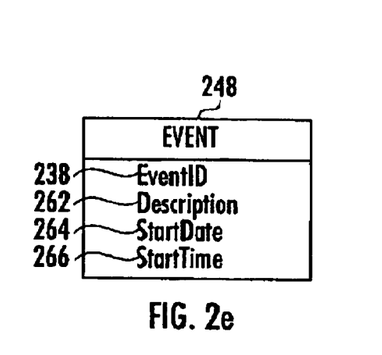
FIG. 2e is a data structure diagram of exemplary embodiments of attributes of events.

Turning again to FIG. 2, an additional example embodiment is shown as including registering a user for an event (210). Event registrations (210) typically include attributes for user identification (226), event identification (238), and event subscription level (240). Events are aggregations of digital content presented through networks to client devices, the events having a start date (264) and a start time (266), that is, a defined approximate beginning time, events typically being identified as shown in the example of FIG. 2e, by an event identification code (238). Events typically aggregate at least at least one output stream and at least one source.

The invention itself does not necessarily require event codes as such, although most embodiments do employ some means, such as event codes, of associating the aggregate of sources comprising an event. Alternative ways of identifying an aggregate of sources includes, for example, listing the sources in a list and using a single server for an event in which all sources available to the server are considered sources for an event. Events in typical embodiments are distinguished from services by possession of a starting time and typically also a defined duration, or an approximate duration, whereas services typically are ongoing for undetermined durations.

Embodiments comprising events typically include logging in users for the event, logging in users typically including assigning values to user login attributes (206), the user login attributes typically including user identification (226), device type (228), network address (230), and a tier identification (232).

In embodiments including events, tier values typically are assigned in dependence upon event identification codes (240). Many embodiments that include events also assign tiers in dependence upon event subscription levels (240). Of course many such embodiments also assign tiers in dependence upon device types, demographics, or user preferences.

Figure 3:
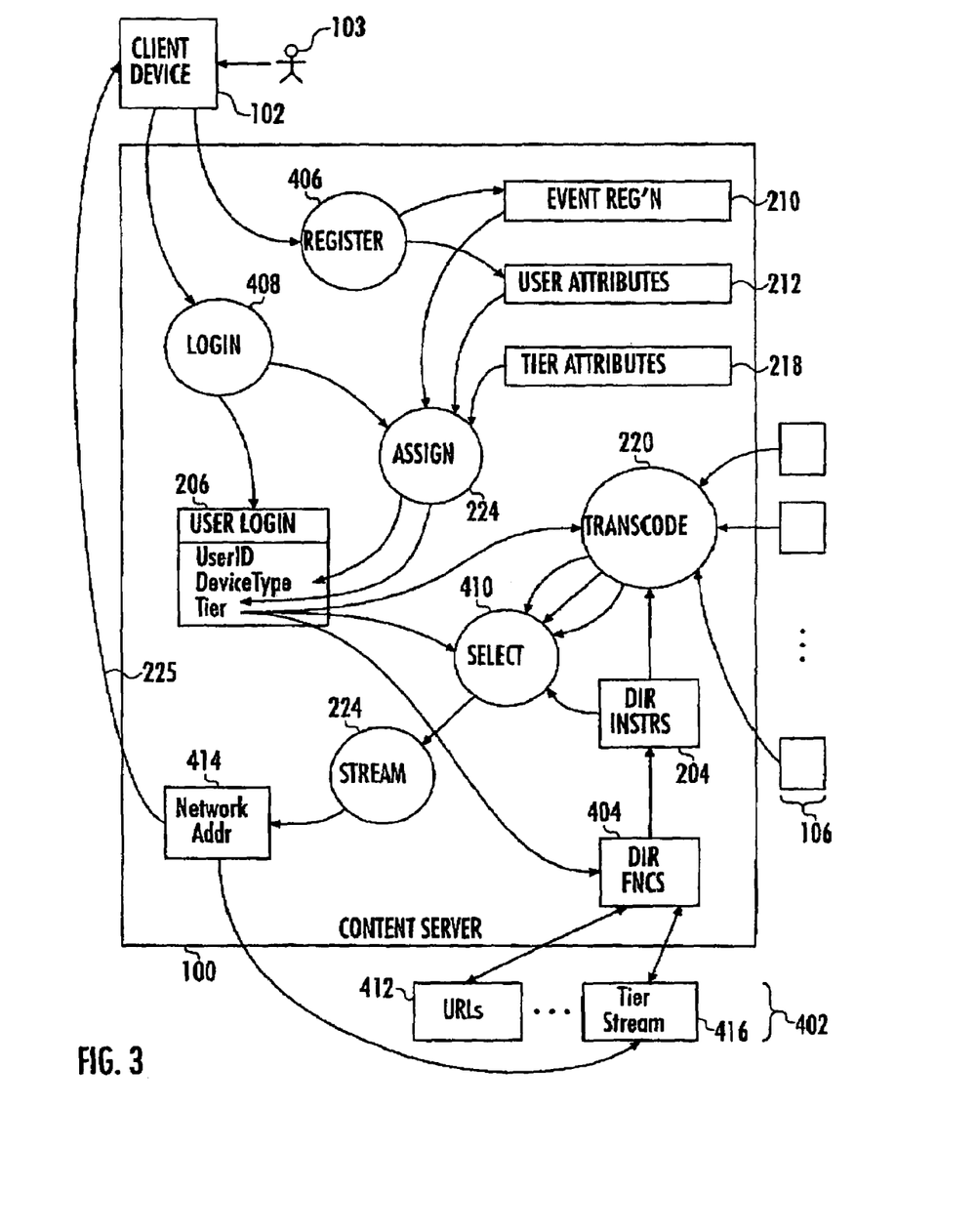

Turning now to FIG. 3, an embodiment of the method of the present invention is illustrated as a use case for an event comprising a football game. In the illustrated embodiment of FIG. 3, a user (103) through a client device (102) registers (406) for an event. The use in the illustrated case has no previous service registration, is therefore unknown to the content server, and user attributes (212), including preferences and demographics, are therefore gathered at registration. Registering for this previously unknown user includes assigning to the use a user identification code.

After registering for the event, either prior to or after the event begins, the user logs in (408) to view the event. At login, the user login record (206) is created and assigned (224) a device type and a tier. The device type is either taken from a default device type stored in user attributes at the time of registration, or is taken from a browser header at the time of login. The tier is assigned by matching user attributes with tier attributes among more than one tier record and selecting a tier whose demographics, user preferences, and device type match or approximately match the user's demographics, user preferences, and/or device type.

Now in the illustrated embodiment of FIG. 3, transcoding (220) and digital content selection (410) for an output stream for the tier are all accomplished in dependence upon the tier value so assigned. If, for example, the tier assigned on the basis of device type and user attributes has attributes including a device being a high definition video screen, no preferences as to language, violence, or adult content, and demographics of high income bracket, an output stream having digital content meeting these requirements is formulated by transcoding and selecting digital content in response to director instructions. The output stream (225) so formulated is communicated (224) in the illustrated embodiment to the user (103) through the client device (102) from the network address (414) associated by the tier (218) with the output stream (225).

If after registration no tier exists that is a good match for the user attributes, a new tier is created having attributes that well match user attributes. Creating a new tier merely includes typing in through a keyboard, for example, into a new tier record, a new set of tier attributes including a network address or URL through which an output stream formulated in accordance with the new tier attributes is communicated to client devices. In typical embodiments the quality of match between tier attributes and user attributes is determined according to tier selection criteria. Many formulations of tier selection criteria will occur to those of skill in the art. Any tier matching criteria used with any embodiment of the invention are well within the scope of the invention.

In the illustrated embodiment of FIG. 3, the software functions (404) associated with a director are stored in a content server (100). Coupled through a network for data communication to the content server in the illustrated embodiment are several personal computers comprising director workstations (402). In typical embodiments of this kind, at least one of the director workstations (416) is configured to present output streams formulated for tiers in dependence upon director's instructions. In such embodiments, at least one of the director workstations (412) is configured to present for invocation through a user interface URLs that in turn invoke director functions or member methods comprising director functions such as servlets that when invoked or called issue or comprise director instructions for transcoding and selecting digital content to formulate of an output stream.

In typical embodiments that include events, selections effected by director instructions are dependent upon the tier, and transcoding includes transcoding in dependence upon the tier. Director instructions for selection of digital content and transcoding in dependence upon tier result in output streams formulated and presented according to tier, and in such embodiments, communicating to client devices the output stream includes communicating the output stream to a network address associated with a user login. As described above, typical embodiments utilizing events assign the network address for communication of output streams through the tier (reference 241 on FIG. 2a).

It will be understood from the foregoing description that various modifications and changes may be made in embodiments of the present invention without departing from its true spirit. All exemplary embodiments described in this specification are mere examples, not limiting definitions of the invention. It is intended that descriptions in this specification are only for purposes of illustration and are not to be construed in a limiting sense. The scope of this invention should be limited only by the language of the following claims.

What is claimed is:

1. A method of remote direction of streaming digital content from a multiplicity of sources of digital information to a multiplicity of client devices the method implemented upon a network of digital computers, at least one of the digital computers comprising a content server upon which the steps of the method are implemented in computer memory and at least one computer processor, the method comprising the steps of:
    receiving digital content from the sources, the digital content having a multiplicity of digital formats;
    receiving, from a remote director, and storing in computer memory, remote director instructions, the remote director instructions including instructions for selections of the digital content for inclusion in an output stream;
    carrying out the remote director instructions, wherein carrying out the remote director instructions further comprises:
    selecting in dependence upon the remote director's instructions the digital content for inclusion in the output stream;
    transcoding, in dependence upon the remote director's instructions the digital content from sources into digital content having streaming format;
    including in the output stream, in dependence upon the remote director's instructions, the digital content having streaming format;
    communicating, in dependence upon the remote director's instructions, to at least one of the client devices the output stream;
    wherein the client devices comprise client device attributes; and
    said transcoding further comprising transcoding in dependence upon the client device attributes.

2. The method of claim 1 wherein client device attributes include device type, screen size, frame rate and audio status.

3. The method of claim 1 wherein the remote director comprises a personal computer coupled through a network to the content server, the method further comprising:
    sending from the remote director to the content server remote director instructions, further comprising invoking through URLs displayed on a terminal of the remote director member methods in servlets installed on the content server.

4. The method of claim 3 wherein the invoking through URLs further comprises invoking through each URL a single member method in a servlet.

5. The method of claim 4 wherein the single member method is programmed to carry out a single remote director instruction.

6. The method of claim 4 wherein the single member method is implemented as a Java thread-level URL dispatch routine.

7. The method of claim 3 wherein the remote director instruction comprises an instruction to select for transcoding and streaming digital content from a specific source.

8. The method of claim 1 further comprising the steps of:
    registering a user for a service, the service identified by a service identification code, the service comprising at least one output stream;

logging in the user for the service, logging in the user further comprising assigning values to user login attributes, the user login attributes comprising user identification, device type, network address, and a tier;
assigning a tier value in dependence upon the device type and the service identification code;
wherein the selections are dependent upon the tier;
wherein transcoding further comprises transcoding in dependence upon the tier; and
wherein communicating to at least one of the client devices the output stream further comprises communicating the output stream to the network address.

9. The method of claim 5 wherein:
registering a user further comprises creating a service registration record comprising service registration attributes comprising user id, service id and service subscription level; and
assigning a tier value further comprises assigning a tier value in dependence upon the service subscription level.

10. The method of claim 1 further comprising the steps of:
registering a user for an event, the event identified by an event identification code, the event comprising at least one output stream, at least one source, a start date and a start time;
logging in the user for the event, logging in the user further comprising assigning values to user login attributes, the user login aifributes comprising user identification, device type, network address, and a tier;
assigning a tier value in dependence upon the device type and the event identification code;
wherein the selections are dependent upon the tier;
wherein transcoding fbrther comprises transcoding in dependence upon the tier; and
wherein communicating to at least one of the client devices the output steam further comprises communicating the output stream to the network address.

11. The method of claim 4 wherein:
registering a user further comprises creating an event registration record comprising event registration attributes comprising user id, event id, event subscription level, start date, and start time; and
assigning a tier value further comprises assigning a tier value in dependence upon the event subscripton level.

12. A system for remote direction of streaming digital content from a multiplicity of sources of digital information to a multiplicity of client devices the system implemented upon a network of digital computers, at least one of the digital computers comprising a content server upon which the system is implemented in computer memory and upon at least one computer processor, the system comprising:
means for receiving digital content from the sources, the digital content having a multiplicity of digital formats;
means for receiving, from a remote director, and storing in computer memory, remote director instructions, the remote director instructions including instructions for selections of the digital content for inclusion in an output stream;
means for carrying out the remote director instructions, wherein carrying out the remote director instructions further comprises:
means for selecting in dependence upon the remote director's instructions, the digital content for inclusion in the output stream;
means for transcoding, in dependence upon the remote director's instructions the digital content from sources into digital content having streaming format;
means for including in the output stream, in dependence upon the remote director's instructions, the digital content having streaming format;
means for communicating to at least one of the client devices the output stream;
wherein the client devices comprise client device attributes; and
said transcoding further comprising transcoding in dependence upon the client device attributes.

13. The system of claim 12 wherein client device attributes include device type, screen size, frame rate and audio status.

14. The system of claim 12 wherein the remote director comprises a personal computer coupled through a network to the content server, the system further comprising:
means for sending from the remote director to the content server remote director instructions, further comprising means for invoking through URLs displayed on a terminal of the remote director member methods in servlets installed on the content server.

15. The system of claim 14 wherein the means for invoking through URLs further comprises means for invoking through each URL a single member method in a servlet.

16. The system of claim 15 wherein the single member method is programmed to carry out a single remote director instruction.

17. The system of claim 15 wherein the single member method is implemented as a thread-level Java URL dispatch routine.

18. The system of claim 14 wherein the remote director instruction comprises an instruction to select for transcoding and streaming digital content from a specific source.

19. The system of claim 12 further comprising:
means for registering a user for a service, the service identified by a service identification code, the service comprising at least one output stream;
means for logging in the user for the service, said means for logging in the user further comprising means for assigning values to user login attributes, the user login attributes comprising user identification, device type, network address, and a tier;
means for assigning a tier value in dependence upon the device type and the service identification code;
wherein the selections are dependent upon the tier;
wherein means for transcoding further comprises means for transcoding in dependence upon the tier; and
wherein means for communicating to at least one of the client devices the output stream further comprises means for communicating the output stream to the network address.

20. The system of claim 16 wherein:
means for registering a user further comprises means for creating a service registration record comprising service registration attributes comprising user id, service id and service subscription level; and
means for assigning a tier value further comprises means for assigning a tier value in dependence upon the service subscription level.

21. The system of claim 12 further comprising:
means for registering a user for an event the event identified by an event identification code, the event comprising at least one output stream, at least one source, a start date and a start time;
means for logging in the user for the event, logging in the user further comprising assigning values to user login attributes, the user login attributes comprising user identification, device type, network address, and a tier;

means for assigning a tier value in dependence upon the device type and the event identification code;
wherein the selections are dependent upon the tier;
wherein means for transcoding further comprises means for transcoding in dependence upon the tier; and
wherein means for communicating to at least one of the client devices the output stream further comprises means for communicating the output stream to the network address.

22. The system of claim 15 wherein:
means for registering a user further comprises means for creating an event registration record comprising event registration attributes comprising user id, event id, event subscription level, start date, and start time; and
means for assigning a tier value further comprises means for assigning a tier value in dependence upon the event subscription level.

23. A computer program product for remote direction of streaming digital content from a multiplicity of sources of digital information to a multiplicity of client devices the system implemented upon a network of digital computers, at least one of the digital computers comprising a content server upon which the system is implemented in computer memory and upon at least one computer processor, the computer program product comprising:
a recording medium;
means, recorded on the recording medium, for receiving digital content from the sources, the digital content having a multiplicity of digital formats;
means, recorded on the recording medium, for receiving, from a remote director, and storing in computer memory, remote director instructions, the remote director instructions including instructions for selections of the digital content for inclusion in an output stream;
means, recorded on the recording medium, for carrying out the remote director instructions, wherein carrying out the remote director instructions further comprises:
means, recorded on the recording medium, for selecting in dependence upon the remote director's instructions, the digital content for inclusion in the output stream;
means, recorded on the recording medium, for transcoding, in dependence upon the remote director's instructions the digital content from sources into digital content having streaming format;
means, recorded on the recording medium, for including in the output stream, in dependence upon the remote director's instructions, the digital content having streaming format;
means, recorded on the recording medium, for communicating to at least one of the client devices the output stream;
wherein the client devices comprise client device attributes; and said transcoding further comprising transcoding in dependence upon the client device attributes.

24. The computer program product of claim 23 wherein client device attributes include device type, screen size, frame rate, and audio status.

25. The computer program product of claim 23 wherein the remote director comprises a personal computer coupled through a network to the content server, the system further comprising:
means, recorded on the recording medium, for sending from the remote director to the content server remote director instructions, further comprising means, recorded on the recording medium, for invoking through URLs displayed on a terminal of the remote director member methods in servlets installed on the content server.

26. The computer program product of claim 25 wherein the means for invoking through URLs further comprises means for invoking through each URL a single member method in a servlet.

27. The computer program product of claim 26 wherein the single member method is programmed to carry out a single remote director instruction.

28. The computer program product of claim 26 wherein the single member method is implemented as a thread-level Java URL dispatch routine.

29. The computer program product of claim 25 wherein the remote director instruction comprises an instruction to select for transcoding and streaming digital content from a specific source.

30. The computer program product of claim 23 further comprising:
means, recorded on the recording medium, for registering a user for a service, the service identified by a service identification code, the service comprising at least one output stream;
means, recorded on the recording medium, for logging in the user for the service, said means for logging in the user further comprising means for assigning values to user login attributes, the user login attributes comprising user identification, device type, network address, and a tier;
means, recorded on the recording medium, for assigning a tier value in dependence upon the device type and the service identification code;
wherein the selections are dependent upon the tier;
wherein means for transcoding further comprises means for transcoding in dependence upon the tier; and
wherein means for communicating to at least one of the client devices the output stream further comprises means for communicating the output stream to the network address.

31. The computer program product of claim 27 wherein:
means for registering a user further comprises means for creating a service registration record comprising service registration attributes comprising user id, service id and service subscription level; and
means for assigning a tier value further comprises means for assigning a tier value in dependence upon the service subscription level.

32. The computer program product of claim 23 further comprising:
means, recorded on the recording medium, for registering a user for an event, the event identified by an event identification code, the event comprising at least one output stream, at least one source, a start date and a start time;
means, recorded on the recording medium, for logging in the user for the event,
logging in the user further comprising assigning values to user login attributes, the user login attributes comprising user identification, device type, network address, and a tier;
means, recorded on the recording medium, for assigning a tier value in dependence upon the device type and the event identification code;
wherein the selections are dependent upon the tier;
wherein means for trans coding further comprises means for transcoding in dependence upon the tier; and wherein means for communicating to at least one of the client devices the output stream further comprises means for communicating the output stream to the network address.

33. The computer program product of claim 26 wherein: means for registering a user further comprises means for creating an event registration record comprising event registration attributes comprising user id, event id, event subscription level, start date, and start time; and means for assigning a tier value further comprises means for assigning a tier value in dependence upon the event subscription level.

* * * * *